United States Patent
Tahata (10) Patent No.: US 7,511,564 B2
(45) Date of Patent: Mar. 31, 2009

(54) VOLTAGE-BOOSTER POWER SUPPLY CIRCUIT

(75) Inventor: Takashi Tahata, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 11/907,897

(22) Filed: Oct. 18, 2007

(65) Prior Publication Data

US 2008/0094129 A1   Apr. 24, 2008

(30) Foreign Application Priority Data

Oct. 20, 2006   (JP)   ............................ 2006-285968

(51) Int. Cl.
*G05F 1/10*   (2006.01)

(52) U.S. Cl. ..................................... 327/536

(58) Field of Classification Search ................. 327/536, 327/589, 390; 326/88
See application file for complete search history.

(56) References Cited

U.S. PATENT DOCUMENTS 5,767,735 A * 6/1998 Javanifard et al. ........... 327/536
5,909,141 A * 6/1999 Tomishima .................. 327/536
5,994,948 A * 11/1999 Bartoli et al. ................ 327/536
6,472,926 B2 * 10/2002 Taito et al. .................... 327/536
7,315,194 B2 * 1/2008 Shiga et al. .................. 327/535

FOREIGN PATENT DOCUMENTS

JP   9-163721   6/1997

* cited by examiner

*Primary Examiner*—Lincoln Donovan
*Assistant Examiner*—Hai L. Nguyen
(74) *Attorney, Agent, or Firm*—McGinn IP Law Group, PLLC

(57) ABSTRACT

A voltage-booster power supply circuit comprises a semiconductor IC and an external circuitry. The semiconductor IC has: first and second charge pump circuits each of which boosts a voltage by using a capacitor in response to a control signal; and a selection circuit. In a first mode, the selection circuit outputs out-of-phase first and second control signals as the control signal to the first and second charge pump circuits, respectively. The external circuitry is provided with first and second pumping capacitors that are connected as the above-mentioned capacitor to the first and second charge pump circuits, respectively. While in a second mode, the selection circuit outputs an in-phase control signal as the control signal to the first and second charge pump circuits. The external circuitry is provided with a common pumping capacitor that is connected as the above-mentioned capacitor to the first and second charge pump circuits in common.

7 Claims, 9 Drawing Sheets

VOLTAGE-BOOSTER POWER SUPPLY CIRCUIT

BACKGROUND OF THE INVENTION

1. Field of the Invention

The present invention relates to a voltage-booster power supply circuit. In particular, the present invention relates to a voltage-booster power supply circuit that is applicable to a semiconductor device requiring a voltage higher than a power supply voltage.

2. Description of Related Art

An internal circuit of a semiconductor device often requires a voltage higher than a power supply voltage. In such a case, a voltage-booster power supply circuit is used which supplies the voltage higher than the power supply voltage to the internal circuit of the semiconductor device. An example of the voltage-booster power supply circuit is described in Japanese Laid Open Patent Application JP-Heisei-9-163721 (JP-P1997-163721).

In the voltage-booster power supply circuit described in the above-mentioned patent document, first and second drive circuits for generating voltages are respectively connected to first and second charge pump circuits, and outputs of the first and second charge pump circuits are made common (configured to be complementary). Consequently, the two charge pump circuits operate while mutually cancelling a voltage ripple. It is thus possible to suppress the voltage ripple appearing in an output voltage and to supply a stable voltage.

Examples requiring a voltage-booster power supply circuit include a case where a voltage higher than the power supply voltage is applied to a word line. The examples also include a case where a voltage higher than the power supply voltage is applied to an anti-fuse. Such an example will be described below.

Figure 1:
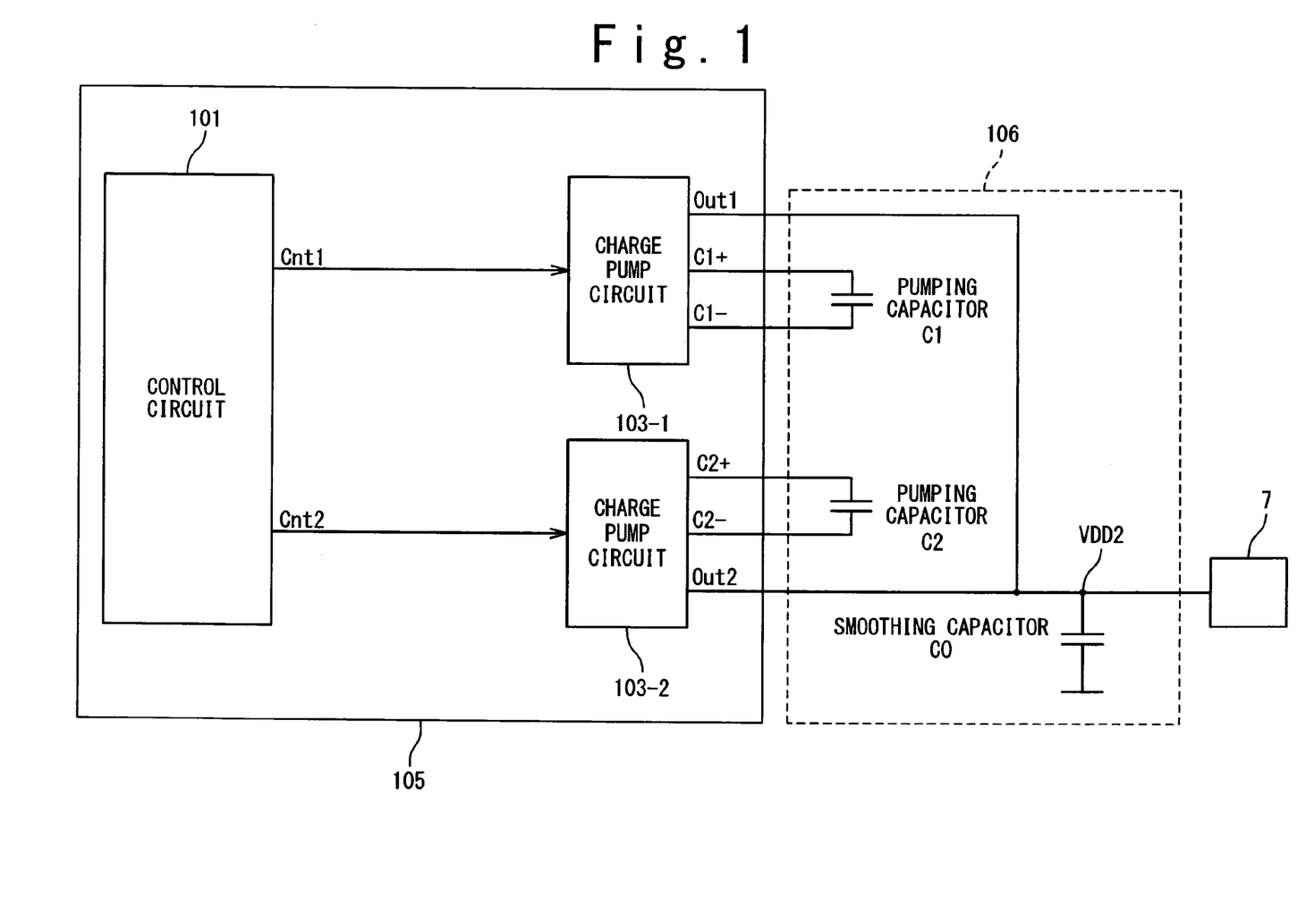
FIG. 1 illustrates an example of a configuration of a voltage-booster power supply circuit.

FIG. 1 illustrates an example of a configuration of a voltage-booster power supply circuit. The voltage-booster power supply circuit shown in FIG. 1 includes a semiconductor integrated circuit 105 and an external circuitry 106. A target circuit 7 as a power supply target is connected to the voltage-booster power supply circuit.

The semiconductor integrated circuit 105 is provided with a control circuit 101 and charge pump circuits 103-1 and 103-2. The control circuit 101 is connected to the charge pump circuits 103-1 and 103-2. The power supply voltage VDD is supplied to the charge pump circuits 103-1 and 103-2. The charge pump circuit 103-1 has a voltage output terminal Out1 and output terminals C1+ and C1−. The charge pump circuit 103-2 has a voltage output terminal Out2 and output terminals C2+ and C2−.

The external circuitry 106 is provided with a smoothing capacitor C0 and pumping capacitors C1 and C2. The smoothing capacitor C0 has positive and negative electrodes. Applied to the negative electrode is a common voltage Vcom as a reference voltage lower than the power supply voltage VDD. The positive electrode is connected to the voltage output terminal Out1 of the charge pump circuit 103-1, the voltage output terminal Out2 of the charge pump circuit 103-2 and the target circuit 7. The pumping capacitor C1 has positive and negative electrodes.

The positive and negative electrodes are connected to the output terminals C1+ and C1− of the charge pump circuit 103-1, respectively. The pumping capacitor C2 has positive and negative electrodes. The positive and negative electrodes are connected to the output terminals C2+ and C2− of the charge pump circuit 103-2, respectively.

2

The control circuit 101 outputs control signals Cnt1 and Cnt2, which are out-of-phase with each other, to the charge pump circuits 103-1 and 103-2, respectively, so as to complementarily operate the two charge pump circuits 103-1 and 103-2. For example, the control signal Cnt2 is a reversed phase control signal with respect to the control signal Cnt1. In response to the control signal Cnt1, the charge pump circuit 103-1 boosts a first voltage (power supply voltage VDD) with the use of the pumping capacitor C1 to generate a second voltage VDD2. In response to the control signal Cnt2, the charge pump circuit 103-2 boosts the first voltage (power supply voltage VDD) with the use of the pumping capacitor C2 to generate the second voltage VDD2. The second voltage VDD2 is smoothed by the smoothing capacitor C0 and then supplied as a third voltage to the target circuit 7.

Let us consider a case where a signal level of the control signal Cnt1 is low (L) level and that of the control signal Cnt2 is high (H) level. In this case, the charge pump circuit 103-1 applies the common voltage Vcom to the output terminal C1−, applies the first voltage VDD to the output terminal C1+, and thereby accumulates charges corresponding to the voltage difference (VDD−Vcom) in the pumping capacitor C1. On the other hand, charges corresponding to the voltage difference are being accumulated in the pumping capacitor C2, and the charge pump circuit 103-2 applies the first voltage VDD to the output terminal C2−. Consequently, the second voltage VDD2 that is obtained by adding the voltage difference (VDD−Vcom) to the first voltage VDD is applied to the output terminal C2+. The charge pump circuit 103-2 outputs the second voltage VDD2 to the voltage output terminal Out2. The second voltage VDD2 is smoothed by the smoothing capacitor C0 and then supplied as the third voltage to the target circuit 7.

Similarly, let us consider a case where a signal level of the control signal Cnt2 is low (L) level and that of the control signal Cnt1 is high (H) level. In this case, the charge pump circuit 103-2 applies the common voltage Vcom to the output terminal C2−, applies the first voltage VDD to the output terminal C2+, and thereby accumulates charges corresponding to the voltage difference (VDD−Vcom) in the pumping capacitor C2. On the other hand, charges corresponding to the voltage difference are being accumulated in the pumping capacitor C1, and the charge pump circuit 103-1 applies the first voltage VDD to the output terminal C1−. Consequently, the second voltage VDD2 that is obtained by adding the voltage difference (VDD−Vcom) to the first voltage VDD is applied to the output terminal C1+. The charge pump circuit 103-1 outputs the second voltage VDD2 to the voltage output terminal Out1. The second voltage VDD2 is smoothed by the smoothing capacitor C0 and then supplied as the third voltage to the target circuit 7.

For example, the target circuit 7 includes: a display unit in which a plurality of pixels are arranged in a matrix form; a plurality of gate lines respectively connected with a plurality of pixel rows of the display unit; and a plurality of data lines respectively connected with a plurality of pixel columns of the display unit. In this case, the semiconductor integrated circuit 105 is a driver IC that retrieves a display data from the outside and displays it on the display unit. The above-mentioned third voltage is applied to a selected gate line out of the plurality of gate lines.

Alternatively, the target circuit 7 may include: a memory unit and a fuse circuit. The memory unit has a plurality of memory cells and a redundant memory cell group. The fuse circuit has an anti-fuse group that is used for replacing a defect memory cell group in the plurality of memory cells with the redundant memory cell group. In this case, the semiconductor integrated circuit 105 is a driver IC for reading/writing data from/to the memory unit. The above-mentioned third voltage is applied to a selected anti-fuse out of the anti-fuse group.

As described above, the voltage-booster power supply circuit can apply the voltage higher than the power supply voltage VDD to the gate line (word line) or the anti-fuse. Here, the two charge pump circuits 103-1 and 103-2 are respectively connected to the two pumping capacitors C1 and C2 that are external components in the external circuitry 106, and the voltage-booster power supply circuit operate the charge pump circuits 103-1 and 103-2 in a complementary manner. As a result, according to the above voltage-booster power supply circuit, a higher current supply capability can be obtained as compared with a case where only one charge pump circuit 103-1 connected to one pumping capacitor C1 as the external component is operated.

SUMMARY

The inventor of the present application has recognized the following points.

With the diversification of the display unit or the memory unit, demands with respect to the voltage-booster power supply circuit are also diversified. The demands with respect to the voltage-booster power supply circuit include: (A) giving priority to current supply capability; and (B) giving priority to low cost.

In the case of (A), a higher current supply capability can be obtained by increasing the number of pumping capacitors as the external components, as described above.

Figure 2:
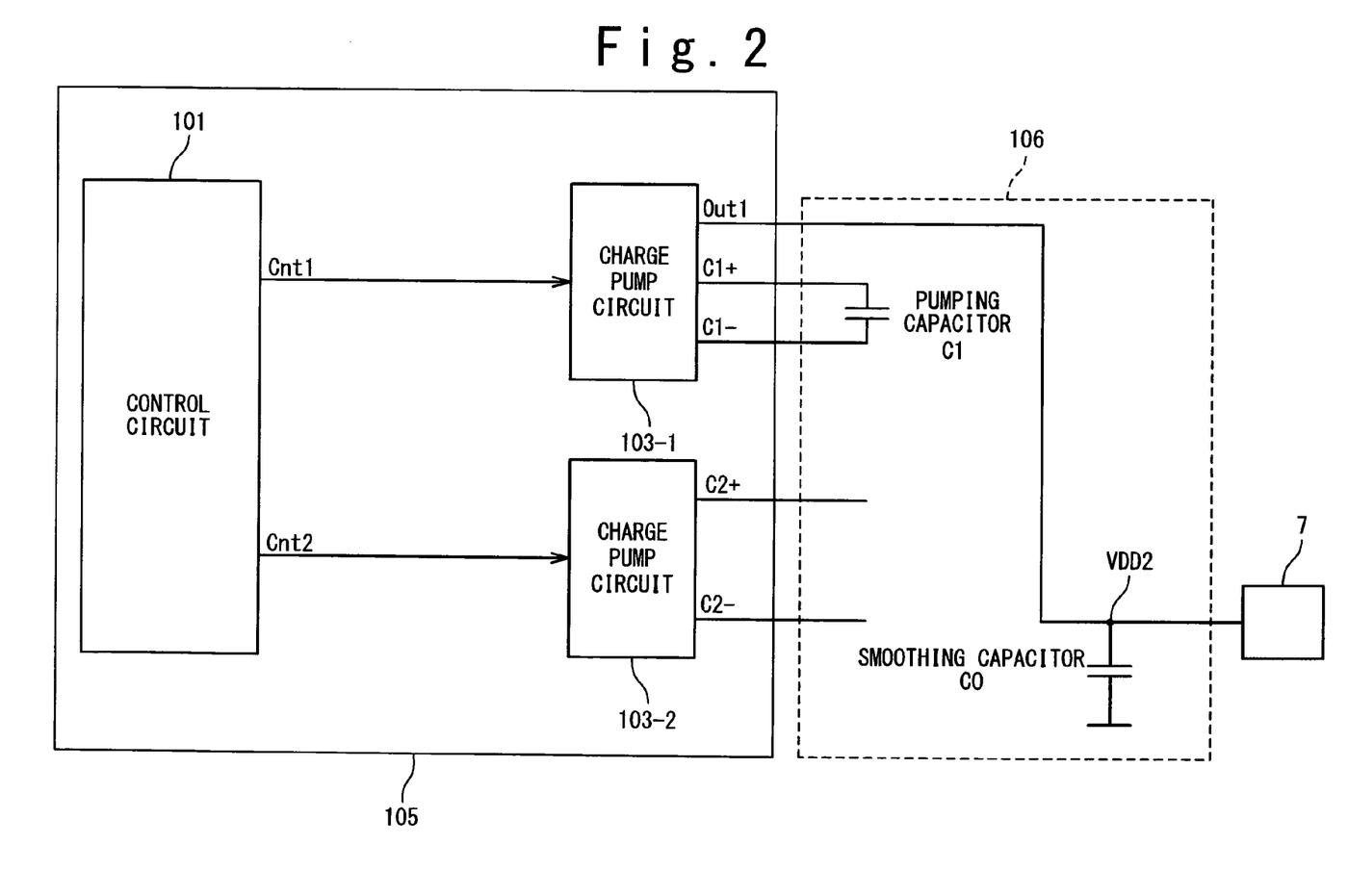
FIG. 2 illustrates another example of a configuration of a voltage-booster power supply circuit.

In the case of (B), the cost can be reduced by reducing the number of pumping capacitors as the external components. For example, as shown in FIG. 2, the pumping capacitor C2 as the external component is cut off in order to reduce the cost. In this case, only one charge pump circuit 103-1, which is connected to the pumping capacitor C1 as the external component, is effective among the two operable charge pump circuits 103-1 and 103-2 in the semiconductor integrated circuit 105. Therefore, the current supply capability becomes lower.

As described above, the current supply capability can be enhanced by increasing the number of the external components. On the other hand, the cost can be reduced by reducing the number of the external components. It is desirable to support both of (A) the case where priority is given to the current supply capability and (B) the case where priority is given to the low cost.

In one embodiment of the present invention, a voltage-booster power supply circuit includes a semiconductor integrated circuit and an external circuitry externally connected to the semiconductor integrated circuit. The semiconductor integrated circuit operates in a first mode and a second mode. The first mode is "current supply capability enhancement mode", while the second mode is "external components reduction mode".

The semiconductor integrated circuit has a first charge pump circuit, a second charge pump circuit, and a selection circuit. Each of the first and second charge pump circuits boosts a first voltage by using a capacitor to generate a second voltage, in response to a control signal.

In the case of the first mode ((A) current supply capability enhancement mode), the selection circuit outputs a first control signal and a second control signal as the above-mentioned control signal, which are out-of-phase with each other, respectively to the first charge pump circuit and the second charge pump circuit. In this case, the external circuitry is provided with a first pumping capacitor and a second pumping capacitor that are connected as the above-mentioned capacitor to the first charge pump circuit and the second charge pump circuit, respectively.

In the case of the second mode ((B) external components reduction mode), the selection circuit outputs an in-phase control signal as the above-mentioned control signal to the first charge pump circuit and the second charge pump circuit. In this case, the external circuitry is provided with a common pumping capacitor that is connected as the above-mentioned capacitor to the first charge pump circuit and the second charge pump circuit in common.

In this manner, the semiconductor integrated circuit is capable of supporting both of (A) the case where priority is given to the current supply capability and (B) the case where priority is given to the low cost.

In the case of the (A) current supply capability enhancement mode, the first and second charge pump circuits are respectively connected to the first and second pumping capacitors that are external components in the external circuitry, and the voltage-booster power supply circuit operates the first and second charge pump circuits in a complementary manner. As a result, according to the voltage-booster power supply circuit of the present invention, a higher current supply capability can be obtained as compared with a case where only one charge pump circuit connected to one pumping capacitor as an external component is operated.

In the case of the (B) external components reduction mode, the first and second charge pump circuits are connected in common to the one common pumping capacitor that is an external component in the external circuitry, and the voltage-booster power supply circuit operates the first and second charge pump circuits with the in-phase control signal. Thus, according to the voltage-booster power supply circuit of the present invention, the number of pumping capacitors as the external components can be reduced. Therefore, the cost can be reduced as compared with the case where (A) the current supply capability enhancement mode is performed.

Moreover, in the case of the (B) external components reduction mode, the common pumping capacitor is connected to the first charge pump circuit, and the first and second charge pump circuits are operated in-phase. At this time, in order to reduce an effect of parasitic resistance, the common pumping capacitor is connected also to the second charge pump circuit and hence unused terminals of the second charge pump circuit are short-circuited. According to the voltage-booster power supply circuit of the present invention, the first and second charge pump circuits are operated in-phase in the (B) external components reduction mode. Consequently, the effect of parasitic resistance can be reduced as compared with the case where (A) the current supply capability enhancement mode is performed.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A voltage-booster power supply circuit according to the present invention can meet both the demands: (A) giving priority to the current supply capability; and (B) giving priority to the low cost.

In the case of (A), the number of pumping capacitors as external components is increased in order to obtain a higher current supply capability. In this case, a "current supply capability enhancement mode (first mode)" to be described later is performed.

In the case of (B), the number of pumping capacitors as external components is reduced in order to reduce the cost. In this case, an "external components reduction mode (second mode)" to be described later is performed.

First Embodiment

Figure 3:
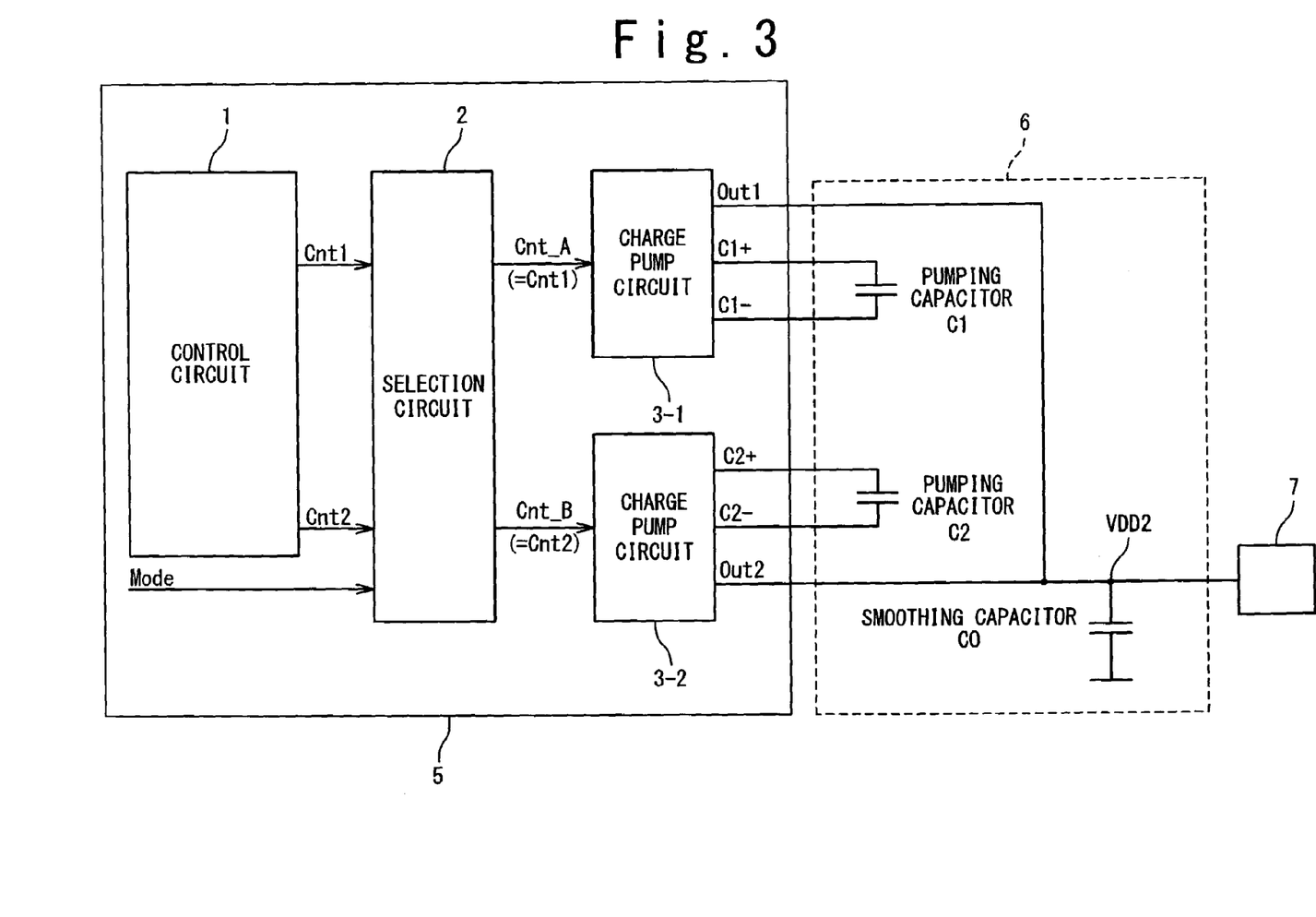
FIG. 3 illustrates a circuit configuration of a voltage-booster power supply circuit in (A) current supply capability enhancement mode according to a first embodiment of the present invention.
Figure 4:
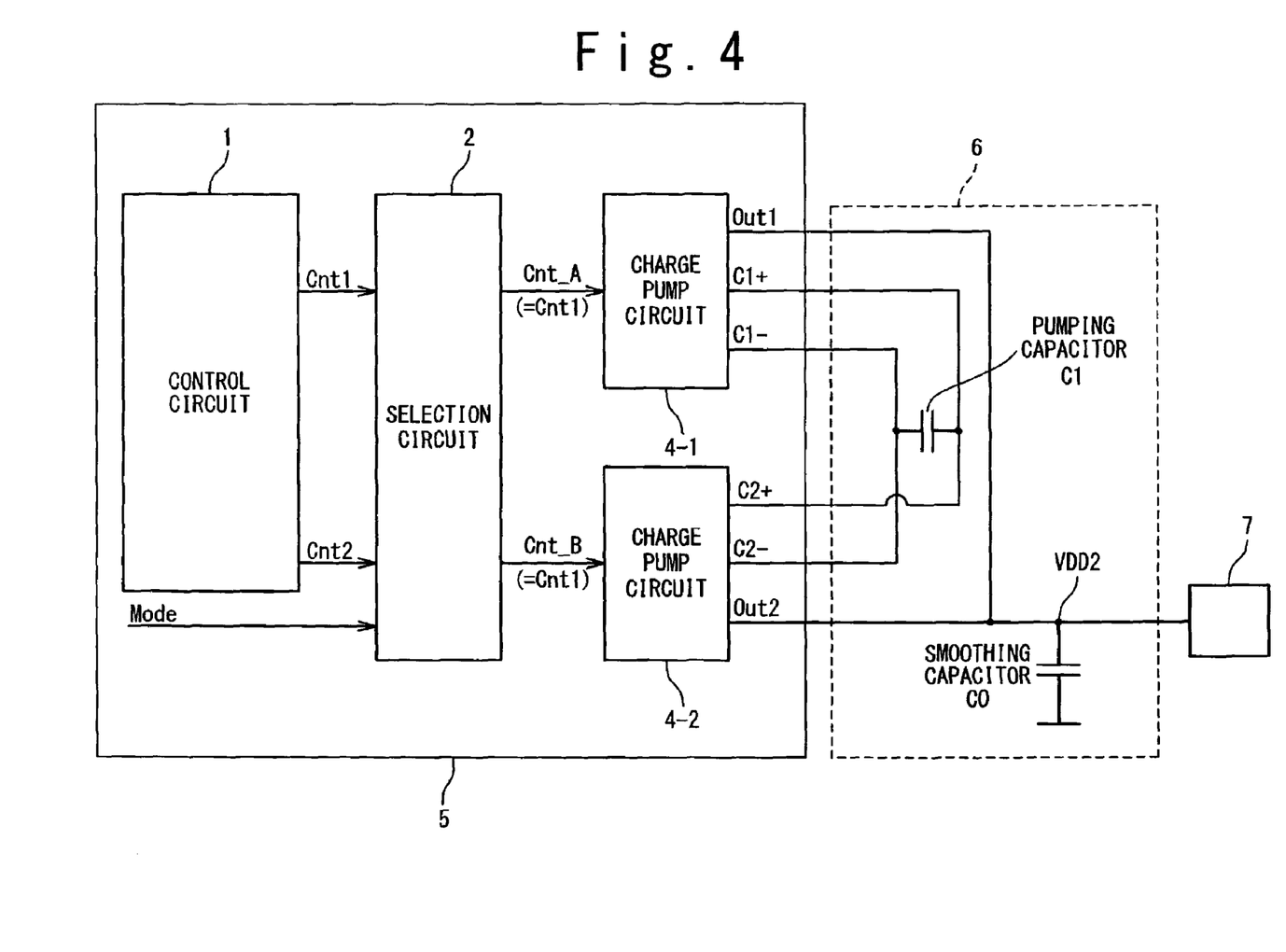
FIG. 4 illustrates a circuit configuration of a voltage-booster power supply circuit in (B) external components reduction mode according to the first embodiment of the present invention.

FIGS. 3 and 4 illustrate configurations of a voltage-booster power supply circuit according to a first embodiment of the present invention. More specifically, FIG. 3 shows a circuit configuration in the case of (A) current supply capability enhancement mode (first mode), while FIG. 4 shows a circuit configuration in the case of (B) external components reduction mode (second mode).

The voltage-booster power supply circuit according to the present embodiment includes a semiconductor integrated circuit 5 and an external circuitry 6. The external circuitry 6 is externally connected to the semiconductor integrated circuit 5.

Moreover, as shown in FIGS. 3 and 4, a target circuit 7 as a power supply target is connected to the voltage-booster power supply circuit.

The semiconductor integrated circuit 5 includes a control circuit 1 and a selection circuit 2. The control circuit 1 is connected to the selection circuit 2. The semiconductor integrated circuit according to the present embodiment can operate in the "current supply capability enhancement mode (first mode)" and the "external components reduction mode (second mode)".

In the (A) current supply capability enhancement mode, as shown in FIG. 3, the semiconductor integrated circuit 5 includes charge pump circuits 3-1 and 3-2. The selection circuit 2 is connected to the charge pump circuits 3-1 and 3-2. A power supply voltage VDD is supplied to the charge pump circuits 3-1 and 3-2. The charge pump circuit 3-1 has a voltage output terminal Out1 and output terminals C1+ and C1−. The charge pump circuit 3-2 has a voltage output terminal Out2 and output terminals C2+ and C2−.

The external circuitry 6 is provided with a smoothing capacitor C0. The smoothing capacitor C0 has positive and negative electrodes. Applied to the negative electrode is a common voltage Vcom as a reference voltage lower than the power supply voltage VDD. The positive electrode is connected to the voltage output terminal Out1 of the charge pump circuit 3-1, the voltage output terminal Out2 of the charge pump circuit 3-2 and the target circuit 7.

In the (A) current supply capability enhancement mode, the external circuitry 6 is further provided with pumping capacitors C1 and C2. The pumping capacitor C1 has positive and negative electrodes. The positive and negative electrodes are connected to the output terminals C1+ and C1− of the charge pump circuit 3-1, respectively. The pumping capacitor C2 has positive and negative electrodes. The positive and negative electrodes are connected to the output terminals C2+ and C2− of the charge pump circuit 3-2, respectively.

In the (A) current supply capability enhancement mode, the charge pump circuits 3-1 and 3-2 are made operate complementarily, as described later.

In the (B) external components reduction mode, as shown in FIG. 4, the semiconductor integrated circuit 5 includes charge pump circuits 4-1 and 4-2 instead of the above-mentioned charge pump circuits 3-1 and 3-2. The charge pump circuits 4-1 and 4-2 have the same functions as those of the charge pump circuits 3-1 and 3-2, respectively. The selection circuit 2 is connected to the charge pump circuits 4-1 and 4-2. The power supply voltage VDD is supplied to the charge pump circuits 4-1 and 4-2. The charge pump circuit 4-1 has a voltage output terminal Out1 and output terminals C1+ and C1−. The charge pump circuit 4-2 has a voltage output terminal Out2 and output terminals C2+ and C2−.

In the (B) external components reduction mode, the external circuitry 6 is further provided with a common pumping capacitor C1 instead of the above-mentioned pumping capacitors C1 and C2. That is to say, the pumping capacitor C2 as an external component is removed. The common pumping capacitor C1 has positive and negative electrodes. The positive and negative electrodes are connected to the output terminals C1+ and C1− of the charge pump circuit 4-1, respectively. The positive and negative electrodes are also connected to the output terminals C2+ and C2− of the charge pump circuit 4-2, respectively. In this manner, the common pumping capacitor C1 is connected to the charge pump circuits 4-1 and 4-2 in common.

In the (B) external components reduction mode, the charge pump circuits 4-1 and 4-2 are made operate in the same phase, as described later. Therefore, the positive and negative electrodes of the common pumping capacitor C1 are connected to the output terminals C2+ and C2− of the charge pump circuit 4-2, respectively, and thus the unused terminals of the charge pump circuit 4-2 are short-circuited. By operating the two charge pump circuits 4-1 and 4-2 in the same phase, it is possible to reduce an effect of parasitic resistance as compared with the case (A) where the two charge pump circuits 3-1 and 3-2 are made operate alternately.

The selection circuit 2 in the semiconductor integrated circuit 5 performs the (A) the current supply capability enhancement mode or the (B) external components reduction mode in response to an external mode signal Mode. Operations of the voltage-booster power supply circuit during these modes will be described below.

Figure 5:
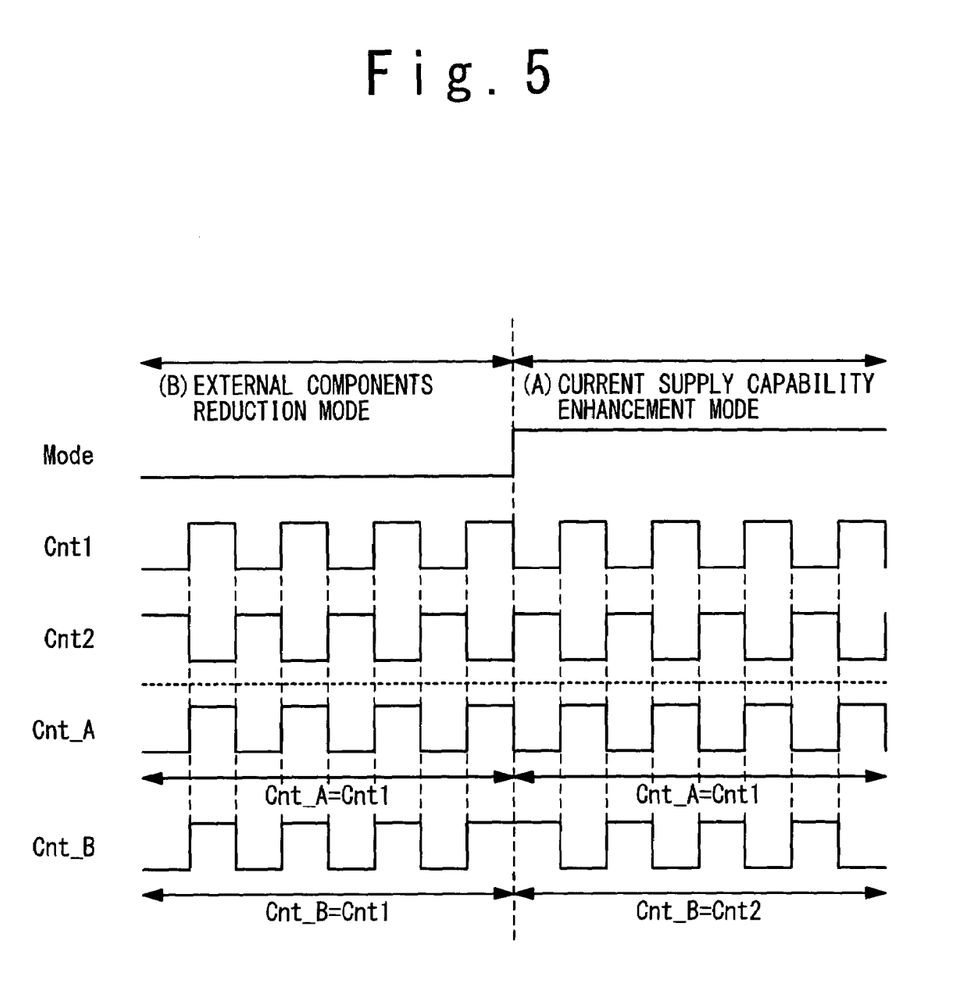
FIG. 5 is a timing chart showing operations in the (B) external components reduction mode and the (A) current supply capability enhancement mode of the voltage-booster power supply circuit according to the first embodiment.

FIG. 5 is a timing chart showing operations in the (B) external components reduction mode and the (A) current supply capability enhancement mode of the voltage-booster power supply circuit according to the first embodiment of the present invention.

First, the (A) current supply capability enhancement mode will be explained.

The control circuit 1 outputs control signals Cnt1 and Cnt2 to the selection circuit 2. The control signals Cnt1 and Cnt2 are to be supplied to the charge pump circuits 3-1 and 3-2, respectively. The control signals Cnt1 and Cnt2 are out-of-phase with each other. For example, the control signal Cnt2 is a reversed phase control signal with respect to the control signal Cnt1. The selection circuit 2 receives the control signals Cnt1 and Cnt2 from the control circuit 1.

As shown in FIG. 5, a signal level of the mode signal Mode is H level in the (A) current supply capability enhancement mode, for example. In this case, the selection circuit 2 outputs the control signals Cnt1 and Cnt2 received from the control circuit 1 as out-of-phase control signals Cnt_A and Cnt_B respectively to the charge pump circuits 3-1 and 3-2, which is the execution of the (A) current supply capability enhancement mode. The out-of-phase control signals Cnt_A (Cnt1) and Cnt_B (Cnt2) are control signals for complementarily operating the two charge pump circuits 3-1 and 3-2, respectively.

In the (A) current supply capability enhancement mode, in response to the out-of-phase control signal Cnt_A (Cnt1), the charge pump circuit 3-1 boosts a first voltage (power supply voltage VDD) with the use of the pumping capacitor C1 to generate a second voltage VDD2. Similarly in response to the out-of-phase control signal Cnt_B (Cnt2), the charge pump circuit 3-2 boosts the first voltage (power supply voltage VDD) with the use of the pumping capacitor C2 to generate the second voltage VDD2. The second voltage VDD2 is smoothed by the smoothing capacitor C0 and then supplied as a third voltage to the target circuit 7.

Let us consider a case where a signal level of the out-of-phase control signal Cnt_A (Cnt1) is low (L) level and that of the out-of-phase control signal Cnt_B (Cnt2) is high (H) level. In this case, the charge pump circuit 3-1 applies the common voltage Vcom to the output terminal C1−, applies the first voltage VDD to the output terminal C1+, and thereby accumulates charges corresponding to the voltage difference (VDD−Vcom) in the pumping capacitor C1. On the other hand, charges corresponding to the voltage difference are being accumulated in the pumping capacitor C2, and the charge pump circuit 3-2 applies the first voltage VDD to the output terminal C2−. Consequently, the second voltage VDD2 that is obtained by adding the voltage difference (VDD−Vcom) to the first voltage VDD is applied to the output terminal C2+. The charge pump circuit 3-2 outputs the second voltage VDD2 to the voltage output terminal Out2. The second voltage VDD2 is smoothed by the smoothing capacitor C0 and then supplied as the third voltage to the target circuit 7.

Similarly, let us consider a case where a signal level of the out-of-phase control signal Cnt_B (Cnt2) is low (L) level and that of the out-of-phase control signal Cnt_A (Cnt1) is high (H) level. In this case, the charge pump circuit 3-2 applies the common voltage Vcom to the output terminal C2−, applies the first voltage VDD to the output terminal C2+, and thereby accumulates charges corresponding to the voltage difference (VDD−Vcom) in the pumping capacitor C2. On the other hand, charges corresponding to the voltage difference are being accumulated in the pumping capacitor C1, and the charge pump circuit 3-1 applies the first voltage VDD to the output terminal C1−. Consequently, the second voltage VDD2 that is obtained by adding the voltage difference (VDD−Vcom) to the first voltage VDD is applied to the output terminal C1+. The charge pump circuit 3-1 outputs the second voltage VDD2 to the voltage output terminal Out1. The second voltage VDD2 is smoothed by the smoothing capacitor C0 and then supplied as the third voltage to the target circuit 7.

Next, the (B) external components reduction mode will be explained.

The control circuit 1 outputs the control signals Cnt1 and Cnt2 to the selection circuit 2. The control signals Cnt1 and Cnt2 are out-of-phase with each other. For example, the control signal Cnt2 is a reversed phase control signal with respect to the control signal Cnt1. The selection circuit 2 receives the control signals Cnt1 and Cnt2 from the control circuit 1.

As shown in FIG. 5, a signal level of the mode signal Mode is L level in the (B) external components reduction mode, for example. In this case, the selection circuit 2 outputs any one of the control signals Cnt1 and Cnt2 received from the control circuit 1 as an in-phase control signal (Cnt_A, Cnt_B) to the charge pump circuits 4-1 and 4-2 in common, which is the execution of the (B) external components reduction mode. For example, the selection circuit 2 outputs the control signal Cnt1 as the in-phase control signals Cnt_A and Cnt_B to the charge pump circuits 4-1 and 4-2 in common. The in-phase control signals Cnt_A (Cnt1) and Cnt_B (Cnt1) are control signals for operating the two charge pump circuits 4-1 and 4-2 in the same phase.

In the (B) external components reduction mode, in response to the in-phase control signal Cnt_A (Cnt1), the charge pump circuit 4-1 boosts a first voltage (power supply voltage VDD) with the use of the common pumping capacitor C1 to generate a second voltage VDD2. Similarly in response to the in-phase control signal Cnt_B (Cnt1), the charge pump circuit 4-2 boosts the first voltage (power supply voltage VDD) with the use of the common pumping capacitor C1 to generate the second voltage VDD2. The second voltage VDD2 is smoothed by the smoothing capacitor C0 and then supplied as a third voltage to the target circuit 7.

Let us consider a case where signal levels of the in-phase control signals Cnt_A (Cnt1) and Cnt_B (Cnt1) are the low (L) level. In this case, the charge pump circuits 4-1 and 4-2 apply the common voltage Vcom to the output terminals C1− and C2−, apply the first voltage VDD to the output terminals C1+ and C2+, and thereby accumulate charges corresponding to the voltage difference (VDD−Vcom) in the common pumping capacitor C1, respectively.

Similarly, let us consider a case where signal levels of the in-phase control signals Cnt_A (Cnt1) and Cnt_B (Cnt1) are the high (H) level. In this case, charges corresponding to the voltage difference are being accumulated in the common pumping capacitor C1, and the charge pump circuits 4-1 and 4-2 apply the first voltage VDD to the output terminals C1− and C2−, respectively. Consequently, the second voltage VDD2 that is obtained by adding the voltage difference (VDD−Vcom) to the first voltage VDD is applied to the output terminals C1+ and C2+. The charge pump circuits 4-1 and 4-2 output the second voltage VDD2 to the voltage output terminals Out1 and Out2, respectively. The second voltage VDD2 is smoothed by the smoothing capacitor C0 and then supplied as the third voltage to the target circuit 7.

For example, the target circuit 7 is a display panel having a plurality of pixels. More specifically, the target circuit 7 includes: a display unit in which the plurality of pixels are arranged in a matrix form; a plurality of gate lines respectively connected with a plurality of pixel rows of the display unit; and a plurality of data lines respectively connected with a plurality of pixel columns of the display unit. In this case, the semiconductor integrated circuit 5 is a driver IC that retrieves a display data from the outside and displays it on the display panel. The above-mentioned third voltage is applied to a selected gate line out of the plurality of gate lines. In other words, the third voltage is supplied to the display panel for driving a selected pixel out of the plurality of pixels.

Alternatively, the target circuit 7 may be a memory device. More specifically, the target circuit 7 may include: a memory unit and a fuse circuit. The memory unit has a plurality of memory cells and a redundant memory cell group. The fuse circuit has an anti-fuse group that is used for replacing a defect memory cell group in the plurality of memory cells with the redundant memory cell group. In this case, the semiconductor integrated circuit 5 is a driver IC for reading/writing data from/to the memory unit. The above-mentioned third voltage is applied to a selected anti-fuse out of the anti-fuse group. The third voltage is applied to the anti-fuse in order to replace a defect memory cell with a redundant memory cell.

In this manner, the voltage-booster power supply circuit according to the first embodiment of the present invention is capable of applying the voltage higher than the power supply voltage VDD to the gate line (word line) or the anti-fuse.

In the case of the (A) current supply capability enhancement mode, the two charge pump circuits 3-1 and 3-2 are respectively connected to the two pumping capacitors C1 and C2 that are external components in the external circuitry 6, and the voltage-booster power supply circuit according to the present embodiment operates the two charge pump circuits 3-1 and 3-2 in the complementary manner. As a result, according to the voltage-booster power supply circuit of the present embodiment, a higher current supply capability can be obtained as compared with a case where only one charge pump circuit 3-1 connected to one pumping capacitor C1 as an external component is operated.

In the case of the (B) external components reduction mode, the two charge pump circuits 4-1 and 4-2 are connected in common to the one common pumping capacitor C1 that is an external component in the external circuitry 6, and the voltage-booster power supply circuit according to the present embodiment operates the two charge pump circuits 4-1 and 4-2 with the in-phase control signal. Thus, according to the voltage-booster power supply circuit of the present embodiment, the number of pumping capacitors as the external components can be reduced. Therefore, the cost can be reduced as compared with the case where (A) the current supply capability enhancement mode is performed.

Moreover, in the case of the (B) external components reduction mode, the positive and negative electrodes of the common pumping capacitor C1 are respectively connected to the output terminals C1+ and C1− of the charge pump circuit 4-1, and the charge pump circuits 4-1 and 4-2 are operated in-phase. At this time, in order to reduce the effect of parasitic resistance, the positive and negative electrodes of the common pumping capacitor C1 are respectively connected also to the output terminals C2+ and C2− of the charge pump circuit 4-2, and hence unused terminals of the charge pump circuit 4-2 are short-circuited. According to the voltage-booster power supply circuit of the present embodiment, the two charge pump circuits 4-1 and 4-2 are operated in-phase in the (B) external components reduction mode. Consequently, the effect of parasitic resistance can be reduced as compared with the case where (A) the current supply capability enhancement mode is performed.

As describe above, the semiconductor integrated circuit 5 of the voltage-booster power supply circuit according to the present embodiment is capable of supporting both of (A) the case where priority is given to the current supply capability and (B) the case where priority is given to the low cost.

Second Embodiment

Next, a voltage-booster power supply circuit according to a second embodiment of the present invention will be described below. In the second embodiment, an overlapping description with the above-described first embodiment will be appropriately omitted.

Described in the foregoing first embodiment is the case where the semiconductor integrated circuit 5 is provided with the two charge pump circuits 3-1 (4-1) and 3-2 (4-2), and the (A) current supply capability enhancement mode or the (B) external components reduction mode is performed. In the second embodiment of the present invention, a case where the semiconductor integrated circuit 5 is provided with three or more charge pump circuits will be explained. Also in the present embodiment, the (A) current supply capability enhancement mode or the (B) external components reduction mode is performed. It should be noted that the (A) current supply capability enhancement mode in the present embodiment includes a "(A-1) current supply capability enhancement/external components accommodate mode" and a "(A-2) current supply capability securement/external components reduction mode".

Figure 6:
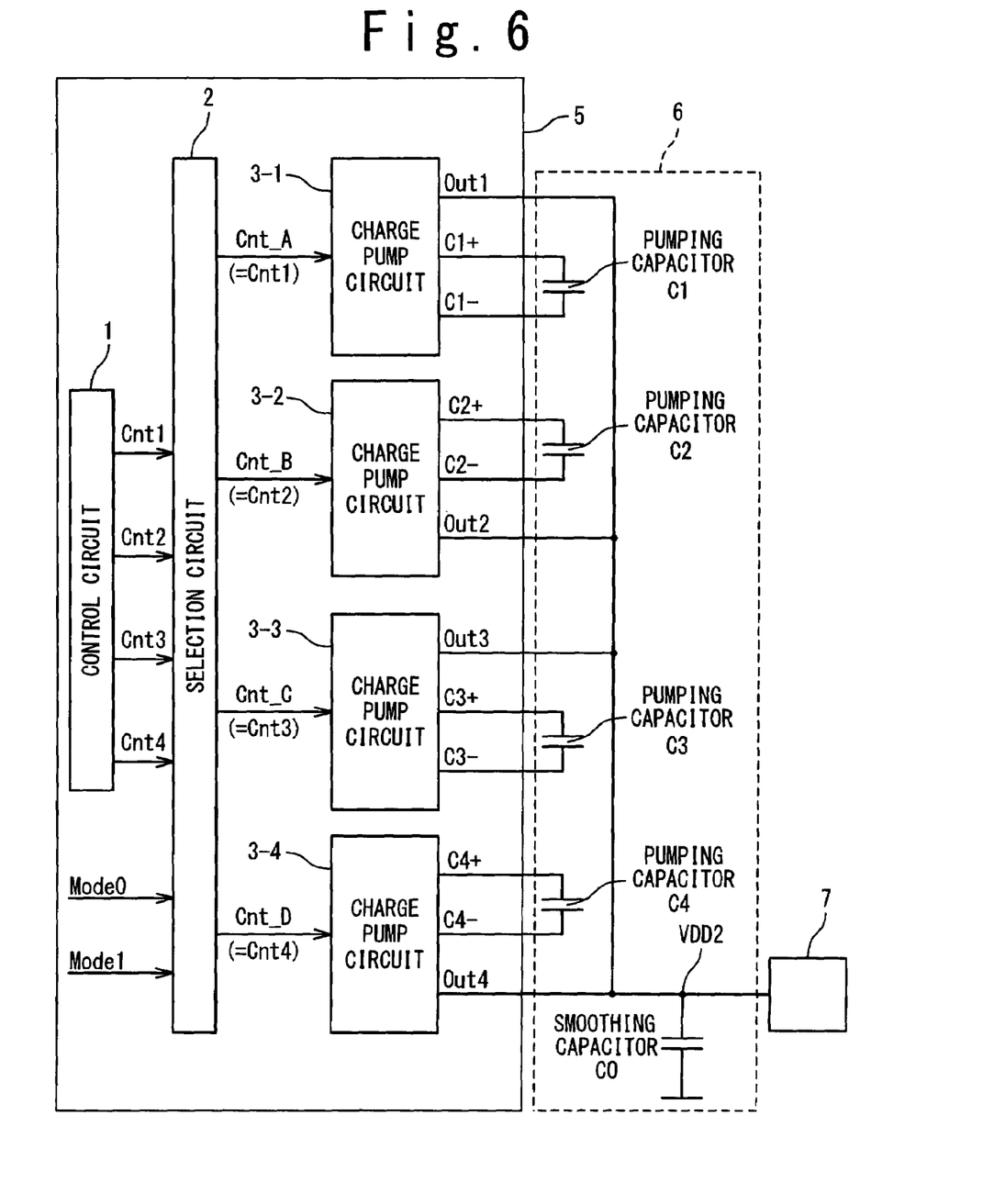
FIG. 6 illustrates a circuit configuration of a voltage-booster power supply circuit in (A-1) current supply capability enhancement/external components accommodate mode according to a second embodiment of the present invention.
Figure 7:
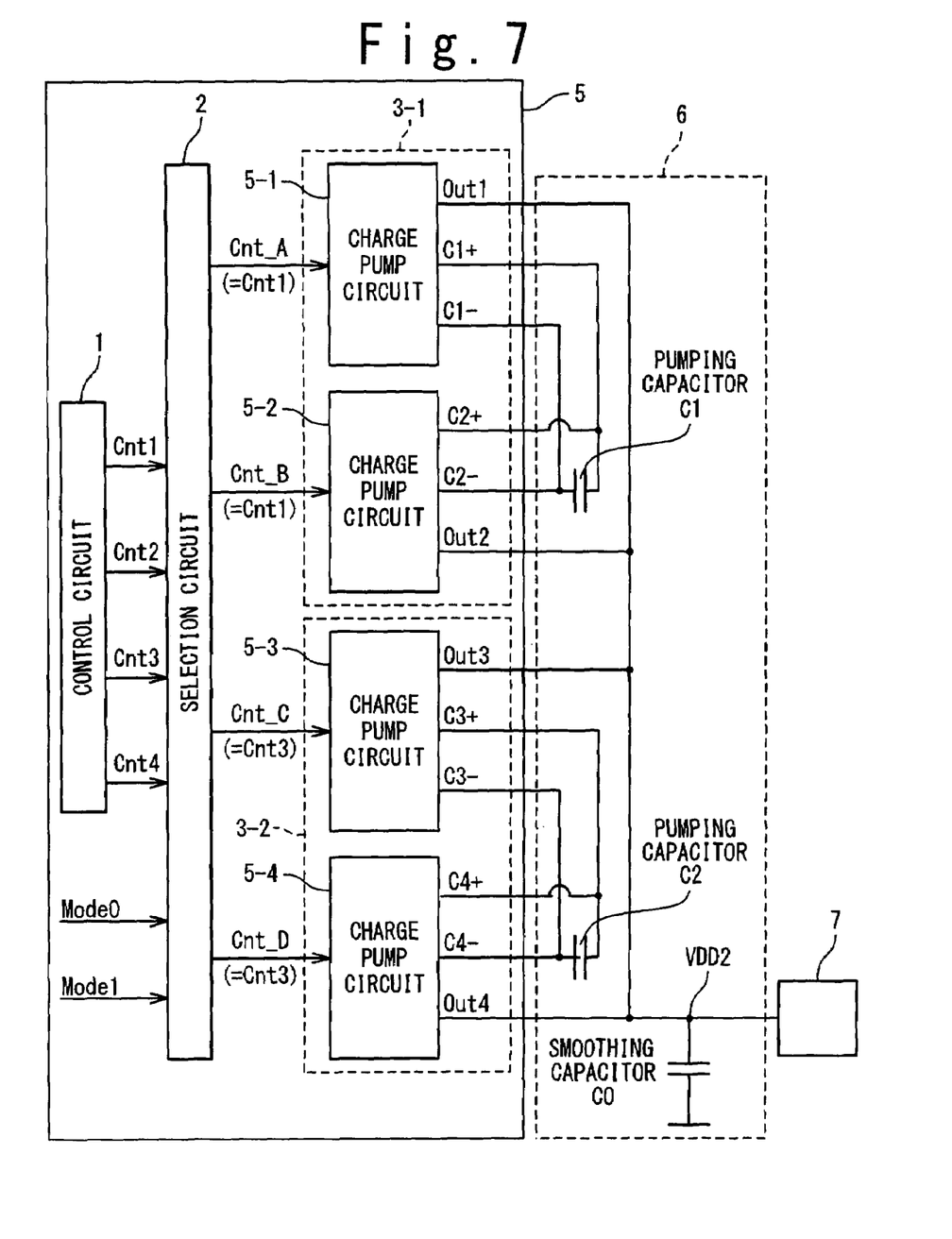
FIG. 7 illustrates a circuit configuration of a voltage-booster power supply circuit in (A-2) current supply capability securement/external components reduction mode according to the second embodiment of the present invention.
Figure 8:
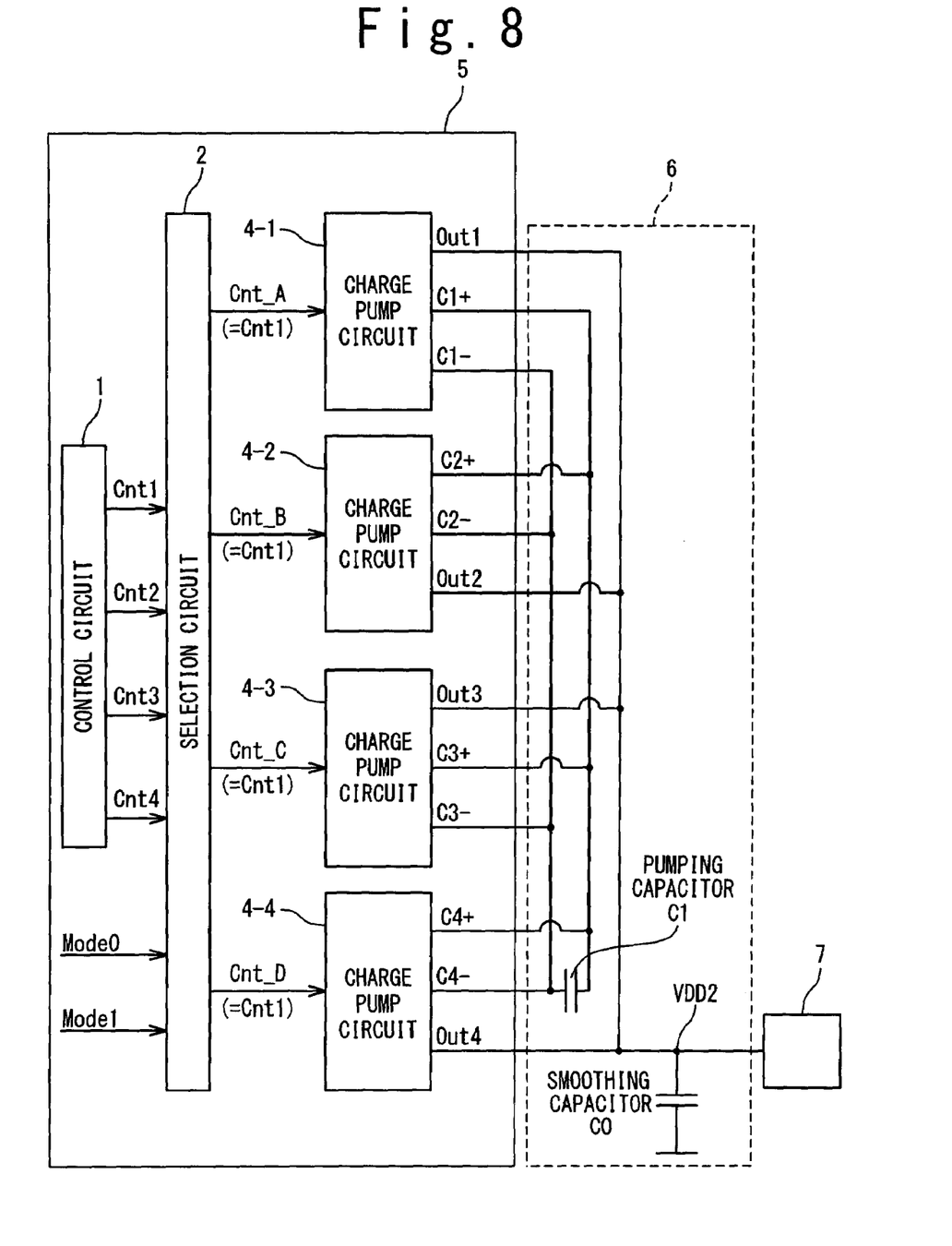
FIG. 8 illustrates a circuit configuration of a voltage-booster power supply circuit in (B) external components reduction mode according to the second embodiment of the present invention.

FIGS. 6 to 8 illustrate configurations of the voltage-booster power supply circuit according to the second embodiment of the present invention. More specifically, FIG. 6 shows a circuit configuration in a case of the (A-1) current supply capability enhancement/external components accommodate mode, FIG. 7 shows a circuit configuration in a case of the (A-2) current supply capability securement/external components reduction mode, FIG. 8 shows a circuit configuration in a case of the (B) external components reduction mode.

With reference to FIG. 6, the (A-1) current supply capability enhancement/external components accommodate mode will be explained.

The semiconductor integrated circuit 5 is provided with M charge pump circuits (M is an integer not less than 3). The M charge pump circuits include the above-mentioned charge pump circuits 3-1 and 3-2. Let us consider a case where M is 4 and the M charge pump circuits are referred to as charge pump circuits 3-1 to 3-4, respectively. The selection circuit 2 is connected to the charge pump circuits 3-1 to 3-4. The power supply voltage VDD is supplied to the charge pump circuits 3-1 to 3-4. The charge pump circuit 3-1 has the voltage output terminal Out1 and the output terminals C1+ and C1−. The charge pump circuit 3-2 has the voltage output terminal Out2 and the output terminals C2+ and C2−. The charge pump circuit 3-3 has a voltage output terminal Out3 and output terminals C3+ and C3−. The charge pump circuit 3-4 has a voltage output terminal Out4 and output terminals C4+ and C4−.

The external circuitry 6 is provided with a smoothing capacitor C0. The smoothing capacitor C0 has positive and negative electrodes. Applied to the negative electrode is the common voltage Vcom as a reference voltage lower than the power supply voltage VDD. The positive electrode is connected to the above-mentioned voltage output terminals Out1 to Out 4 and the target circuit 7.

In the (A-1) current supply capability enhancement/external components accommodate mode, the external circuitry 6 is further provided with M pumping capacitors that include the pumping capacitors C1 and C2. In FIG. 6, M is 4 and the M pumping capacitors are referred to as pumping capacitors C1 to C4, respectively. The pumping capacitor C1 has the positive and negative electrodes, and the positive and negative electrodes are respectively connected to the output terminals C1+ and C1− of the charge pump circuit 3-1. The pumping capacitor C2 has the positive and negative electrodes, and the positive and negative electrodes are respectively connected to the output terminals C2+ and C2− of the charge pump circuit 3-2. The pumping capacitor C3 has positive and negative electrodes, and the positive and negative electrodes are respectively connected to the output terminals C3+ and C3− of the charge pump circuit 3-3. The pumping capacitor C4 has positive and negative electrodes, and the positive and negative electrodes are respectively connected to the output terminals C4+ and C4− of the charge pump circuit 3-4.

In the (A-1) current supply capability enhancement/external components accommodate mode, the charge pump circuits 3-1 and 3-2 are made operate complementarily, as described later.

With reference to FIG. 7, the (A-2) current supply capability securement/external components reduction mode (third mode) will be explained.

The semiconductor integrated circuit 5 is provided with the charge pump circuits 3-1 and 3-2. The charge pump circuit 3-1 includes P charge pump circuits (P is an integer not less than 2), while the charge pump circuit 3-2 includes Q charge pump circuits (Q is an integer not less than 2). Let us consider a case where P and Q are 2, the P charge pump circuits are referred to as charge pump circuits 5-1 and 5-2, respectively, and the Q charge pump circuits are referred to as charge pump circuits 5-3 and 5-4, respectively. The selection circuit 2 is connected to the charge pump circuits 5-1 to 5-4. The power supply voltage VDD is supplied to the charge pump circuits 5-1 to 5-4. The charge pump circuit 5-1 has a voltage output terminal Out1 and output terminals C1+ and C1−. The charge pump circuit 5-2 has a voltage output terminal Out2 and output terminals C2+ and C2−. The charge pump circuit 5-3 has a voltage output terminal Out3 and output terminals C3+ and C3−. The charge pump circuit 5-4 has a voltage output terminal Out4 and output terminals C4+ and C4−.

In the (A-2) current supply capability securement/external components reduction mode (third mode), the external circuitry 6 is provided with the above-mentioned pumping capacitors C1 and C2 as common pumping capacitors, instead of the above-mentioned pumping capacitors C1 to C4. The common pumping capacitor C1 has positive and negative electrodes, and the positive and negative electrodes are connected to the output terminals C1+ and C1− of the charge pump circuit 5-1, respectively, and to the output terminals C2+ and C2− of the charge pump circuit 5-2, respectively. In this manner, the common pumping capacitor C1 is connected to the charge pump circuits 5-1 and 5-2 in common. Similarly, the common pumping capacitor C2 has positive and negative electrodes, and the positive and negative electrodes are connected to the output terminals C3+ and C3− of the charge pump circuit 5-3, respectively, and to the output terminals C4+ and C4− of the charge pump circuit 5-4, respectively. In this manner, the common pumping capacitor C2 is connected to the charge pump circuits 5-3 and 5-4 in common.

In the (A-2) current supply capability securement/external components reduction mode, the charge pump circuits 5-1 and 5-2 are made operate in the same phase and the charge pump circuits 5-3 and 5-4 are made operate in the same phase, as described later. Therefore, the positive and negative electrodes of the common pumping capacitor C1 are connected to the output terminals C2+ and C2− of the charge pump circuit 5-2, respectively, and thus the unused terminals of the charge pump circuit 5-2 are short-circuited. Also, the positive and negative electrodes of the common pumping capacitor C2 are connected to the output terminals C4+ and C4− of the charge pump circuit 5-4, respectively, and thus the unused terminals of the charge pump circuit 5-4 are short-circuited. By operating the two charge pump circuits 5-1 and 5-2 in the same phase and operating the two charge pump circuits 5-3 and 5-4 in the same phase, it is possible to reduce the effect of parasitic resistance as compared with the case where the four charge pump circuits 3-1 to 3-4 are made operate complementarily.

With reference to FIG. 8, the (B) external components reduction mode will be explained.

The semiconductor integrated circuit 5 is provided with N charge pump circuits (N is an integer not less than 3). The N charge pump circuits include the above-mentioned charge pump circuits 4-1 and 4-2. Let us consider a case where N is 4 and the N charge pump circuits are referred to as charge pump circuits 4-1 to 4-4, respectively. The selection circuit 2 is connected to the charge pump circuits 4-1 to 4-4. The power supply voltage VDD is supplied to the charge pump circuits 4-1 to 4-4. The charge pump circuit 4-1 has the voltage output terminal Out1 and the output terminals C1+ and C1−. The charge pump circuit 4-2 has the voltage output terminal Out2 and the output terminals C2+ and C2−. The charge pump circuit 4-3 has a voltage output terminal Out3 and output terminals C3+ and C3−. The charge pump circuit 4-4 has a voltage output terminal Out4 and output terminals C4+ and C4−.

In the (B) external components reduction mode, the external circuitry 6 is further provided with a common pumping capacitor C1, instead of the above-mentioned pumping capacitors C1 to C4 or the above-mentioned common pumping capacitors C1 and C2. That is to say, the pumping capacitor C2 to C4 or the common pumping capacitor C2 as the external components is removed. The common pumping capacitor C1 has positive and negative electrodes. The positive and negative electrodes are connected to the output terminals C1+ and C1− of the charge pump circuit 4-1, respectively. Moreover, the positive and negative electrodes are respectively connected to the output terminals C2+ and C2− of the charge pump circuit 4-2, the output terminals C3+ and C3− of the charge pump circuit 4-3, and the output terminals C4+ and C4− of the charge pump circuit 4-4. In this manner, the common pumping capacitor C1 is connected to the charge pump circuits 4-1 to 4-4 in common.

In the (B) external components reduction mode, the charge pump circuits 4-1 to 4-4 are made operate in the same phase, as described later. Therefore, the positive and negative electrodes of the common pumping capacitor C1 are connected to the output terminals C2+ and C2− of the charge pump circuit 4-2, respectively, and thus the unused terminals of the charge pump circuit 4-2 are short-circuited. Also, the positive and negative electrodes of the common pumping capacitor C1 are connected to the output terminals C3+ and C3− of the charge pump circuit 4-3, respectively, and thus the unused terminals of the charge pump circuit 4-3 are short-circuited. Also, the positive and negative electrodes of the common pumping capacitor C1 are connected to the output terminals C4+ and C4− of the charge pump circuit 4-4, respectively, and thus the unused terminals of the charge pump circuit 4-4 are short-circuited. By operating the four charge pump circuits 4-1 to 4-4 in the same phase, it is possible to reduce the effect of parasitic resistance as compared with the case where the four charge pump circuits 3-1 to 3-4 are made operate complementarily.

The external mode signal Mode includes mode signals Mode0 and Mode1. In response to a combination of the mode signals Mode0 and Mode1, the selection circuit 2 in the semiconductor integrated circuit 5 performs any one of the (A-1) current supply capability enhancement/external components accommodate mode, the (A-2) current supply capability securement/external components reduction mode, and the (B) external components reduction mode. Operations of the voltage-booster power supply circuit during these modes will be described below.

Figure 9:
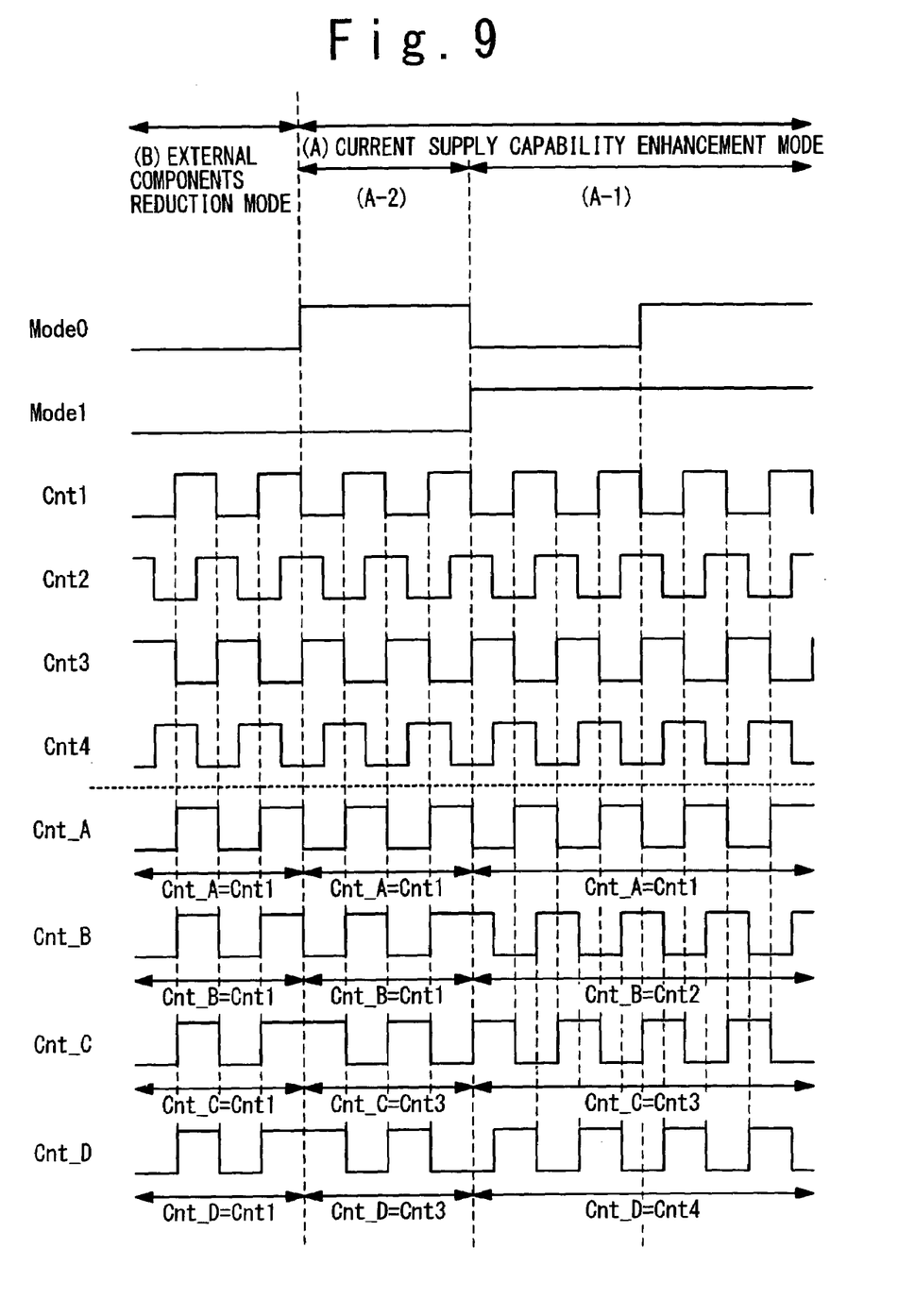
FIG. 9 is a timing chart showing operations in the (B) external components reduction mode, the (A-2) current supply capability securement/external components reduction mode and the (A-1) current supply capability enhancement/external components accommodate mode of the voltage-booster power supply circuit according to the second embodiment.

FIG. 9 is a timing chart showing operations in the (B) external components reduction mode, the (A-2) current supply capability securement/external components reduction mode and the (A-1) current supply capability enhancement/external components accommodate mode of the voltage-booster power supply circuit according to the second embodiment of the present invention.

First, the (A-1) current supply capability enhancement/external components accommodate mode will be explained.

The control circuit 1 outputs M control signals Cnt1, Cnt2, Cnt3 and Cnt4 to the selection circuit 2. The M control signals Cnt1 to Cnt4 are to be supplied to the M charge pump circuits 3-1 to 3-4, respectively. The control signals Cnt1 to Cnt4 are out-of-phase with each other. For example, the phases of the control signals Cnt1, Cnt2, Cnt3 and Cnt4 are shifted by ¼ period from one another in this order. The selection circuit 2 receives the control signals Cnt1 to Cnt4 from the control circuit 1.

As shown in FIG. 9, in the (A-1) current supply capability enhancement/external components accommodate mode, a signal level of the mode signal Mode1 is H level regardless of a signal level of the mode signal Mode0, for example. In this case, the selection circuit 2 outputs the control signals Cnt1, Cnt2, Cnt3 and Cnt4 received from the control circuit 1 as M out-of-phase control signals Cnt_A, Cnt_B, Cnt_C and Cnt_D respectively to the M charge pump circuits 3-1, 3-2, 3-3 and 3-4, which is the execution of the (A-1) current supply capability enhancement/external components accommodate mode. The M out-of-phase control signals Cnt_A (Cnt1), Cnt_B (Cnt2), Cnt_C (Cnt3) and Cnt_D (Cnt4) are control signals for complementarily operating the M charge pump circuits 3-1, 3-2, 3-3 and 3-4, respectively.

In (A-1) the current supply capability enhancement/external components accommodate mode, in response to the out-of-phase control signals Cnt_A (Cnt1), Cnt_B (Cnt2), Cnt_C (Cnt3) and Cnt_D (Cnt4), the charge pump circuits 3-1, 3-2, 3-3 and 3-4 boost a first voltage (power supply voltage VDD) with the use of the pumping capacitors C1, C2, C3 and C4, respectively, to generate a second voltage VDD2. The second voltage VDD2 is smoothed by the smoothing capacitor C0 and then supplied as a third voltage to the target circuit 7.

Next, the (A-2) current supply capability securement/external components reduction mode will be explained.

The control circuit 1 outputs the M control signals Cnt1, Cnt2, Cnt3 and Cnt4 to the selection circuit 2. The control signals Cnt1 to Cnt4 are out-of-phase with each other. For example, the phases of the control signals Cnt1, Cnt2, Cnt3 and Cnt4 are shifted by ¼ period from one another in this order. The selection circuit 2 receives the control signals Cnt1 to Cnt4 from the control circuit 1.

As shown in FIG. 9, in the (A-2) current supply capability securement/external components reduction mode, a signal level of the mode signal Mode1 is L level while a signal level of the mode signal Mode0 is H level, for example. In this case, the selection circuit 2 executes the (A-2) current supply capability securement/external components reduction mode. More specifically, the selection circuit 2 outputs the control signals Cnt1 received from the control circuit 1 as an in-phase control signal (Cnt_A, Cnt_B) to the charge pump circuit 3-1 (the charge pump circuits 5-1 and 5-2) in common. Moreover, the selection circuit 2 outputs the control signals Cnt3 received from the control circuit 1 as an in-phase control signal (Cnt_C, Cnt_D) to the charge pump circuit 3-2 (the charge pump circuits 5-3 and 5-4) in common. The in-phase control signals Cnt_A (Cnt1) and Cnt_B (Cnt1) are control signals for operating the two charge pump circuits 5-1 and 5-2 in the same phase, and the in-phase control signals Cnt_C (Cnt3) and Cnt_D (Cnt3) are control signals for operating the two charge pump circuits 5-3 and 5-4 in the same phase.

In the (A-2) current supply capability securement/external components reduction mode, in response to the in-phase control signals Cnt_A and Cnt_B (Cnt1), the charge pump circuits 5-1 and 5-2 respectively boost the first voltage (power supply voltage VDD) with the use of the common pumping capacitor C1 to generate a second voltage VDD2. Similarly in response to the in-phase control signals Cnt_C and Cnt_D (Cnt3), the charge pump circuits 5-3 and 5-4 respectively boost the first voltage (power supply voltage VDD) with the use of the common pumping capacitor C2 to generate a second voltage VDD2. The second voltage VDD2 is smoothed by the smoothing capacitor C0 and then supplied as a third voltage to the target circuit 7.

Next, the (B) external components reduction mode will be explained.

The control circuit 1 outputs the control signals Cnt1, Cnt2, Cnt3 and Cnt4 to the selection circuit 2. The control signals Cnt1 to Cnt4 are out-of-phase with each other. For example, the phases of the control signals Cnt1, Cnt2, Cnt3 and Cnt4 are shifted by ¼ period from one another in this order. The selection circuit 2 receives the control signals Cnt1 to Cnt4 from the control circuit 1.

As shown in FIG. 9, signal levels of the mode signals Mode0 and Mode1 are L level in the (B) external components reduction mode, for example. In this case, the selection circuit 2 outputs any one of the control signals Cnt1 to Cnt4 received from the control circuit 1 as an in-phase control signal (Cnt_A, Cnt_B, Cnt_C and Cnt_D) to the N charge pump circuits 4-1 to 4-4 in common, which is the execution of the (B) external components reduction mode. For example, the selection circuit 2 outputs the control signal Cnt1 as the in-phase control signals Cnt_A, Cnt_B, Cnt_C and Cnt_D to the N charge pump circuits 4-1, 4-2, 4-3 and 4-4 in common. The in-phase control signals Cnt_A, Cnt_B, Cnt_C and Cnt_D (Cnt1) are control signals for operating the four charge pump circuits 4-1, 4-2, 4-3 and 4-4 in the same phase.

In the (B) external components reduction mode, in response to the in-phase control signals Cnt_A, Cnt_B, Cnt_C and Cnt_D (Cnt1), the charge pump circuits 4-1, 4-2, 4-3 and 4-4 respectively boost the first voltage (power supply voltage VDD) with the use of the common pumping capacitor C1 to generate a second voltage VDD2. The second voltage VDD2 is smoothed by the smoothing capacitor C0 and then supplied as a third voltage to the target circuit 7.

As described above, in the case of the (A-1) current supply capability enhancement/external components accommodate mode, the four charge pump circuits 3-1, 3-2, 3-3 and 3-4 are respectively connected to the four pumping capacitors C1, C2, C3 and C4 that are external components in the external circuitry 6, and the voltage-booster power supply circuit according to the present embodiment operates the four charge pump circuits 3-1, 3-2, 3-3 and 3-4 in the complementary manner. As a result, according to the voltage-booster power supply circuit of the second embodiment, a higher current supply capability can be obtained as compared with the above-mentioned case (A) where the current supply capability enhancement mode is performed.

In the case of the (A-2) the current supply capability securement/external components reduction mode, the two charge pump circuits 5-1 and 5-2 are connected in common to the one common pumping capacitor C1 that is an external component in the external circuitry 6, and the voltage-booster power supply circuit operates the two charge pump circuits 5-1 and 5-2 with the in-phase control signal (Cnt1). Also, the two charge pump circuits 5-3 and 5-4 are connected in common to the one common pumping capacitor C2 that is an external component in the external circuitry 6, and the voltage-booster power supply circuit operates the two charge pump circuits 5-3 and 5-4 with the in-phase control signal (Cnt3). Moreover, the charge pump circuits 5-1, 5-2 and the charge pump circuits 5-3, 5-4 are complementarily operated. Thus, in the case of the (A-2) current supply capability securement/external components reduction mode, the number of pumping capacitors as the external components can be reduced while securing the current supply capability. Therefore, the cost can be reduced as compared with the case where (A-1) the current supply capability enhancement/external components accommodate mode is performed. Furthermore, the current supply capability can be secured to some extent.

Moreover, in the case of the (A-2) current supply capability securement/external components reduction mode, the positive and negative electrodes of the common pumping capacitor C1 are respectively connected to the output terminals C1+ and C1− of the charge pump circuit 5-1, and the charge pump circuits 5-1 and 5-2 are operated in-phase. At this time, in order to reduce the effect of parasitic resistance, the positive and negative electrodes of the common pumping capacitor C1 are respectively connected also to the output terminals C2+ and C2− of the charge pump circuit 5-2, and hence unused terminals of the charge pump circuit 5-2 are short-circuited. Also, the positive and negative electrodes of the common pumping capacitor C2 are respectively connected to the output terminals C3+ and C3− of the charge pump circuit 5-3, and the charge pump circuits 5-3 and 5-4 are operated in-phase. At this time, in order to reduce the effect of parasitic resistance, the positive and negative electrodes of the common pumping capacitor C2 are respectively connected also to the output terminals C4+ and C4− of the charge pump circuit 5-4, and hence unused terminals of the charge pump circuit 5-4 are short-circuited. According to the voltage-booster power supply circuit of the present embodiment, the two charge pump circuits 5-1 and 5-2 are operated in-phase and the two charge pump circuits 5-3 and 5-4 are operated in-phase in the (A-2) current supply capability securement/external components reduction mode. Consequently, the effect of parasitic resistance can be reduced as compared with the case where (A-1) the current supply capability enhancement/external components accommodate mode is performed.

In the case of the (B) external components reduction mode, the four charge pump circuits 4-1, 4-2, 4-3 and 4-4 are connected in common to the one common pumping capacitor C1 that is an external component in the external circuitry 6, and the voltage-booster power supply circuit according to the present embodiment operates the four charge pump circuits 4-1, 4-2, 4-3 and 4-4 with the in-phase control signal (Cnt1). Therefore, according to the voltage-booster power supply circuit of the present embodiment, the number of pumping capacitors as the external components can be reduced and thus the cost can be reduced.

Moreover, in the case of the (B) external components reduction mode, the positive and negative electrodes of the common pumping capacitor C1 are respectively connected to the output terminals C1+ and C1− of the charge pump circuit 4-1, and the charge pump circuits 4-1, 4-2, 4-3 and 4-4 are operated in-phase. At this time, in order to reduce the effect of parasitic resistance, the positive and negative electrodes of the common pumping capacitor C1 are respectively connected to the output terminals C2+ and C2− of the charge pump circuit 4-2, and hence unused terminals of the charge pump circuit 4-2 are short-circuited. Also, the positive and negative electrodes of the common pumping capacitor C1 are respectively connected to the output terminals C3+ and C3− of the charge pump circuit 4-3, and hence unused terminals of the charge pump circuit 4-3 are short-circuited. Also, the positive and negative electrodes of the common pumping capacitor C1 are respectively connected to the output terminals C4+ and C4− of the charge pump circuit 4-4, and hence unused terminals of the charge pump circuit 4-4 are short-circuited. According to the voltage-booster power supply circuit of the present embodiment, the four charge pump circuits 4-1, 4-2, 4-3 and 4-4 are operated in-phase in the (B) external components reduction mode. Consequently, the effect of parasitic resistance can be reduced as compared with the case where the (A-1) current supply capability enhancement/external components accommodate mode is performed.

It is apparent that the present invention is not limited to the above embodiments and may be modified and changed without departing from the scope and spirit of the invention.

What is claimed is:

1. A voltage-booster power supply circuit comprising:
   a semiconductor integrated circuit operating in a first mode and a second mode; and
   an external circuitry connected to said semiconductor integrated circuit,
   wherein said semiconductor integrated circuit has:
   a first charge pump circuit and a second charge pump circuit each of which boosts a first voltage by using a capacitor to generate a second voltage in response to a control signal; and
   a selection circuit configured to output a first control signal and a second control signal as said control signal, which are out-of-phase with each other, respectively to said first charge pump circuit and said second charge pump circuit in said first mode, and to output an in-phase control signal as said control signal to said first charge pump circuit and said second charge pump circuit in said second mode,
   wherein in a case of said first mode, said external circuitry is provided with a first pumping capacitor and a second pumping capacitor that are connected as said capacitor to said first charge pump circuit and said second charge pump circuit, respectively,
   wherein in a case of said second mode, said external circuitry is provided with a common pumping capacitor that is connected as said capacitor to said first charge pump circuit and said second charge pump circuit in common.

2. The voltage-booster power supply circuit according to claim 1,
wherein said semiconductor integrated circuit has N charge pump circuits including said first charge pump circuit and said second charge pump circuit, N being an integer not less than 3,
wherein in a case of said second mode, said common pumping capacitor is connected to said N charge pump circuits in common, and said selection circuit outputs said in-phase control signal to said N charge pump circuits.

3. The voltage-booster power supply circuit according to claim 1,
wherein said first charge pump circuit includes P charge pump circuits, P being an integer not less than 2, and said second charge pump circuit includes Q charge pump circuits, Q being an integer not less than 2,
wherein said first mode includes a third mode,
wherein in a case of said third mode, said first pumping capacitor is connected to said P charge pump circuits in common, said second pumping capacitor is connected to said Q charge pump circuits in common, and said selection circuit outputs said first control signal and said second control signal respectively to said first charge pump circuit and said second charge pump circuit.

4. The voltage-booster power supply circuit according to claim 1,
wherein said semiconductor integrated circuit has M charge pump circuits including said first charge pump circuit and said second charge pump circuit, M being an integer not less than 3,
wherein in a case of said first mode, said external circuitry is provided with M pumping capacitors that include said first pumping capacitor and said second pumping capacitor and are respectively connected to said M charge pump circuits, and said selection circuit outputs M control signals as said control signal, which are out-of-phase with each other, respectively to said M charge pump circuits.

5. The voltage-booster power supply circuit according to claim 1,
wherein said external circuitry is further provided with a smoothing capacitor for smoothing said second voltage generated by said semiconductor integrated circuit to generate a third voltage and supplying said third voltage to a target circuit.

6. The voltage-booster power supply circuit according to claim 5,
wherein said target circuit is a display panel having a plurality of pixels,
wherein said third voltage is supplied to said display panel for driving a selected pixel of said plurality of pixels.

7. The voltage-booster power supply circuit according to claim 5,
wherein said target circuit is a memory device having:
a plurality of memory cells;
a redundant memory cell; and
an anti-fuse used for replacing a defect memory cell in said plurality of memory cells with said redundant memory cell,
wherein said third voltage is applied to said anti-fuse.

* * * * *